United States Patent
Balasubramanian et al.

(10) Patent No.: US 9,128,724 B2
(45) Date of Patent: Sep. 8, 2015

(54) CONFIGURING ASSEMBLY OF A SYSTEM USING SUPPLIED ARCHITECTURAL ARTIFACTS

(75) Inventors: Swaminathan Balasubramanian, Southfield, MI (US); Robert A. Morgan, Orlando, FL (US); Kenneth W. Roberson, North Richland Hills, TX (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 13/596,917

(22) Filed: Aug. 28, 2012

(65) Prior Publication Data

US 2014/0068551 A1 Mar. 6, 2014

(51) Int. Cl.
    *G06F 9/44* (2006.01)

(52) U.S. Cl.
    CPC .. *G06F 8/36* (2013.01); *G06F 8/35* (2013.01); *G06F 8/34* (2013.01)

(58) Field of Classification Search
    CPC .......................................................... G06F 9/44
    USPC ............... 703/2; 717/107, 120, 121, 122, 123
    See application file for complete search history.

(56) References Cited

U.S. PATENT DOCUMENTS

| | | | | |
|---|---|---|---|---|
| 5,123,103 | A * | 6/1992 | Ohtaki et al. | 1/1 |
| 6,275,976 | B1 * | 8/2001 | Scandura | 717/120 |
| 6,305,009 | B1 * | 10/2001 | Goor | 717/116 |
| 6,654,950 | B1 * | 11/2003 | Barnishan | 717/136 |
| 6,681,391 | B1 * | 1/2004 | Marino et al. | 717/175 |
| 6,813,531 | B2 | 11/2004 | Coale et al. | |
| 7,055,129 | B2 * | 5/2006 | Ball | 717/107 |
| 7,971,182 | B1 | 6/2011 | Vlaovic et al. | |
| 8,370,800 | B2 * | 2/2013 | Burke et al. | 717/115 |
| 2002/0143653 | A1 | 10/2002 | DiLena et al. | |
| 2004/0031030 | A1 * | 2/2004 | Kidder et al. | 717/172 |
| 2005/0108687 | A1 | 5/2005 | Mountain et al. | |
| 2005/0289513 | A1 * | 12/2005 | Chen et al. | 717/121 |

(Continued)

OTHER PUBLICATIONS

SCI-GA: Software Component Identification using Genetic Algorithm, 2011.*

(Continued)

*Primary Examiner* — Chat Do
*Assistant Examiner* — Jae Jeon
(74) *Attorney, Agent, or Firm* — Marcia L. Doubet

(57) ABSTRACT

The configuration of a system is programmatically determined. More particularly, these determinations are made using architecture artifacts that describe requirements of the system (which may be comprised of software, hardware, services, or some combination thereof), where these requirements are iteratively compared to characteristics of available components. A percentage of match is preferably computed, thus allowing for complete matches as well as partial matches. A weighting factor may be applied to attributes, effectively prioritizing attributes in view of their relative importance in the assembled system. When more than one component is a candidate for meeting a particular requirement, user input may be obtained to select one of the candidates. One or more attributes (such as cost information) of each candidate, including how well that candidate matched requirements, may be included for each candidate presented for user selection. The model may be updated and re-evaluated iteratively.

16 Claims, 12 Drawing Sheets

(56) References Cited

U.S. PATENT DOCUMENTS

| | | | | |
|---|---|---|---|---|
| 2006/0167665 | A1* | 7/2006 | Ata | 703/2 |
| 2006/0265699 | A1* | 11/2006 | Ali et al. | 717/141 |
| 2007/0299835 | A1* | 12/2007 | Takeuchi | 707/4 |
| 2008/0301628 | A1* | 12/2008 | Lochmann | 717/107 |
| 2009/0031276 | A1* | 1/2009 | Seno | 716/18 |
| 2009/0119638 | A1 | 5/2009 | Li et al. | |
| 2009/0132211 | A1 | 5/2009 | Lane et al. | |
| 2009/0144695 | A1* | 6/2009 | Vairavan et al. | 717/105 |
| 2010/0005451 | A1 | 1/2010 | Hirose et al. | |
| 2010/0077386 | A1* | 3/2010 | Akkiraju et al. | 717/136 |
| 2010/0223285 | A1 | 9/2010 | Biddulph-Krentar | |
| 2010/0306356 | A1 | 12/2010 | Gao et al. | |
| 2011/0004863 | A1 | 1/2011 | Feblowitz et al. | |
| 2011/0167409 | A1* | 7/2011 | Schadow | 717/123 |
| 2011/0271252 | A1* | 11/2011 | Bnayahu et al. | 717/123 |
| 2011/0296372 | A1 | 12/2011 | Bird et al. | |
| 2012/0215734 | A1* | 8/2012 | Mowery et al. | 706/52 |
| 2012/0266168 | A1 | 10/2012 | Spivak et al. | |
| 2014/0068546 | A1 | 3/2014 | Balasubramanian et al. | |

OTHER PUBLICATIONS

"Patterns for e-business for new IT solutions", web-published article of IBM Corporation, printed on Jun. 10, 2012 from https://www.ibm.com/developerworks/patterns/. 9 pages.

"Patterns for e-business for new and enhanced IT solutions", web-published article of IBM Corporation, printed on Jun. 10, 2012 from https://www.ibm.com/developerworks/patterns/index-revised.html. 8 pages.

Lenz, Gunther, et al., "Making the case for Software Factories", web-published article of Microsoft Corporation, printed on Jun. 10, 2012 from http://msdn.microsoft.com/en-library/cc496679.aspx. Apr. 2008. 14 pages.

Dixit, Anurag, et al., "Software Component Retrieval Using Genetic Algorithms", International Conference on Computer and Automation Engineering, IEEE, 2009, 5 pages.

Wu, Zhi-Qiao, et al., "An optimization framework for reuse component selection in software product line", CCDC'09 Proceedings of the 21st Annual International Conference on Chinese Control and Decision Conference, pp. 1935-1939. Abstract only (web-published abstract by ACM Digital Library, printed on Aug. 29, 2012 from http://dl.acm.org/citation.cfm?id=1715388); 2 pages.

Vijayalakshmi, K., et al., "A new algorithm in assembly for component-based software using dependency chart", International Journal Information Systems and Change Management, vol. 2, No. 3, 2007. 18 pages.

Swaminathan Balasubramanian et al., U.S. Appl. No. 13/596,966, filed Aug. 28, 2012, Office Action, Feb. 11, 2015, 27 pages.

* cited by examiner

Components :: Component A
Components :: Component A :: method1 (parameter1 : String) : anyType
Components :: Component A :: method2 (parameter1 : String, parameter2 : String) : Integer
Components :: Component A –> Components :: Component A.method2
Components :: Component A –> Components :: Component B.method3
Components :: Component A –> Components :: Component C.method4
Components :: Component A / Artifact 1 / Execution Environment 1
Components :: Component B
Components :: Component B :: method3 (parameter1 : anyType) : anyType
Components :: Component B –> Components :: Component C.method5
Components :: Component B / Artifact 1 / Execution Environment 1
Components :: Component C
Components :: Component C :: method4 () : Integer
Components :: Component C :: method5 (parameter1 : String) : String
Components :: Component C :: method6 () : Boolean
Components :: Component C / Artifact 2 / Execution Environment 1

*710*
MyGraphRenderer

*720* attributes = {java-version : 1.5, 1.6; jsf-version : 1.2, 2.0; jee-version: 5}

*730* other_comps_needed = {XML2Graph Converter; Trinidad Extensions; MyFaces Extensions}

*740* other_comps_invalid = {Tomahawk Extensions; Trinidad Renderkit}

*750* quality_metrics = {reliability = 0.8, usability = 0.7}

CONFIGURING ASSEMBLY OF A SYSTEM USING SUPPLIED ARCHITECTURAL ARTIFACTS

BACKGROUND

The present invention relates to computing systems, and deals more particularly with determining the configuration (and optionally, the pricing) of a system. Still more particularly, this determination is made using architectural artifacts that describe requirements of the system (which may be comprised of software, hardware, services, or some combination thereof), where these requirements are iteratively compared to characteristics of available components.

Component-based design often involves identifying the right components—that is, components that meet certain requirements—and putting those components together (often called "integration"). In the case of a software system, this process is often performed by a software architect who searches a repository of reusable components, manually evaluates the amount of change or adaptation needed for various ones of these existing components that may be selected, and also manually examines the compatibility and/or dependency between the various components. The software architect may also consider requirements of a service level agreement ("SLA") or quality requirements for a target application in which the components are to be used. (A similar approach may be followed for systems comprised of non-software components, or of such other components in combination with software.)

This existing approach may be tedious and error-prone, particularly when there are a large number of potentially similar components available from which the architect must choose.

BRIEF SUMMARY

The present invention is directed to configuring a set of components to assemble a system (or application or services, equivalently). In one aspect, this comprises: obtaining an architectural model specification that describes a plurality of elements, the elements having requirements associated therewith, for realizing requirements of the system; iteratively processing each of the described elements to select a set of matching components; removing, from an aggregated list of the selected components for the assembly, any of the selected components which are determined to be incompatible with at least one other one of the selected components, thereby creating an updated aggregated list of selected components; and providing, as the set of components to assemble the system, the updated aggregated list of selected components. The iteratively processing preferably further comprises: locating, in a component data repository that stores attribute information for each of a plurality of components available for selection, any of the available components for which the stored attribute information matches the described each element; responsive to locating a plurality of the available components matching the described each element, performing a selection process to select a particular one of the plurality of located components as matching the described each element; adding the selected available component to the aggregated list of selected components for the assembly; and adding, to the aggregated list, any of the available components which are identified, in the stored attribute information for the selected available component, as being co-requisites of the selected available component. The components may comprise, by way of example, software components, hardware components, services, or some combination thereof.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 6 provides a sample index corresponding to the sample model of FIG. 2, where this index contains entries for information extracted from the model specification;

FIG. 7 provides an example of a syntax specification that may be used to describe characteristics of a hypothetical software component;

DETAILED DESCRIPTION

Figure 1:
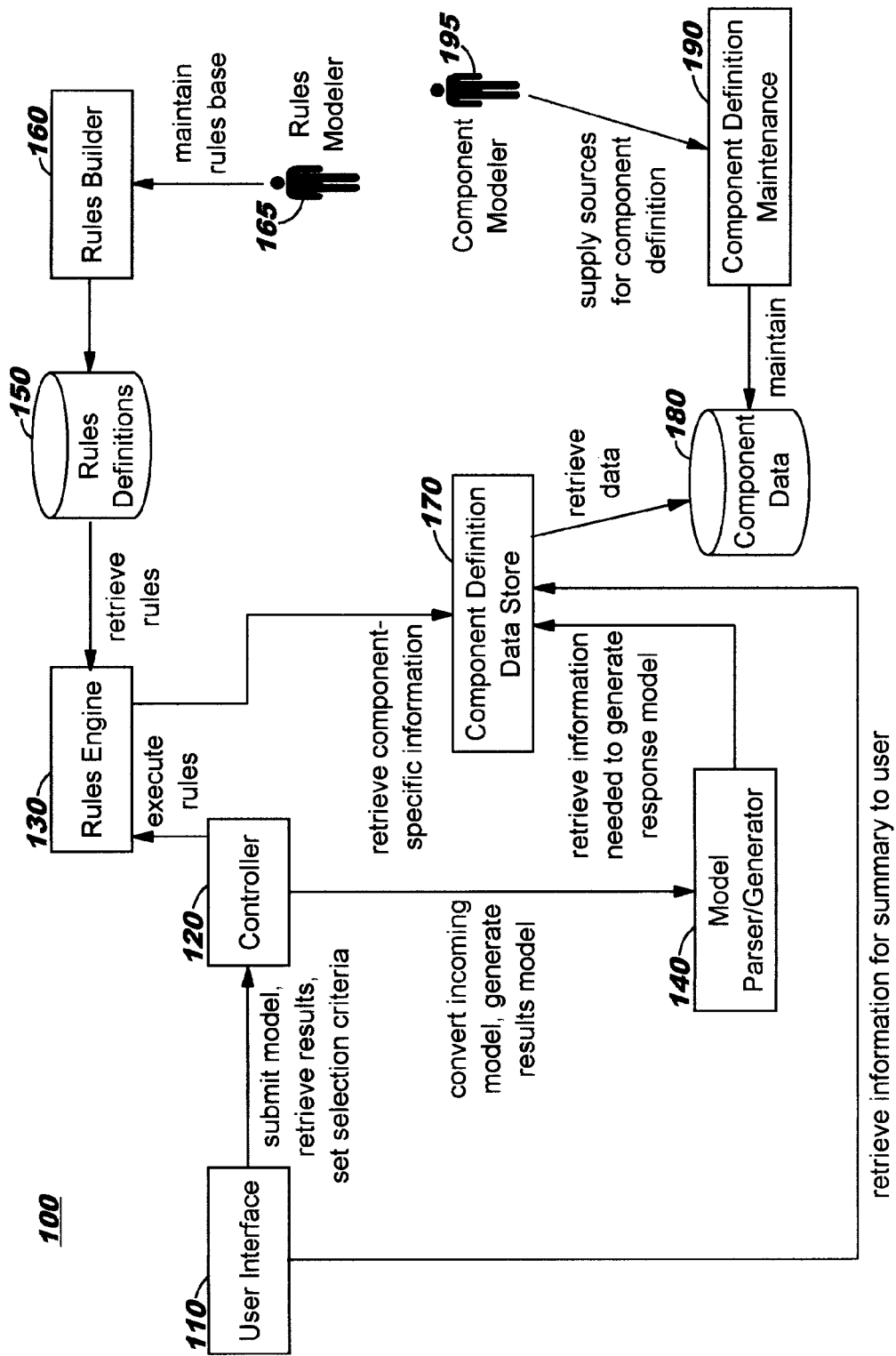
FIG. 1 depicts a system diagram that shows components that may be used when implementing an embodiment of the present invention, and interactions among those components (by way of illustration, but not of limitation)

As noted earlier, component selection may be a tedious and error-prone process when using known techniques. The present inventors are not aware of any previously-existing autonomous processes or tools that suitably perform this task. An embodiment of the present invention is directed toward filling this gap by providing a representational scheme and algorithm to autonomically configure a system using pre-built components, while (inter alia) checking for compatibility issues among selected ones of the components and evaluating the adaptability of the selected components. Accordingly, an embodiment of the present invention programmatically determines a configuration for assembly of a system by identifying and evaluating reusable components. A representational scheme for the candidate components is disclosed, along with an algorithm to evaluate and match the components in view of the requirements of the target system. Optionally, pricing information is included for the components, and may be factored into the component selection process. (Note that references herein to "an embodiment" do not necessarily all refer to the same embodiment.)

As noted earlier, the disclosed techniques may be used for configuring assembly of systems comprised of various types of components, including software, hardware, services, or some combination thereof. Accordingly, while discussions herein are presented primarily with reference to software components, it should be understood that this is by way of illustration but not of limitation and that the scope of the present invention is not limited to systems comprised of software components.

Many software vendors have had a long-time commitment to creating software components that are reusable, so that the components can be leveraged in more than one application. Tools have been available for some time for cataloging such software components, enabling software development personnel to perform an automated search among the existing catalogued components. However, no previously-existing systems are known to the present inventors that provide for automated filtering of candidate components in view of a particular architectural model or an effective way to use architectural artifacts to quickly discover software components that can be applied to the needs of a particular application.

As will be described in further detail herein, an embodiment of the present invention autonomically configures a system using components based on a supplied architectural model. An embodiment of the present invention uses a representational scheme for components to aid in the evaluation and matching (which may consider various factors such as component ratings and dependency determination). An embodiment of the present invention identifies keywords and/or concepts from a supplied specification, and uses an algorithm to match and evaluate an adaptation effort. Efficiency of an architectural solution may be improved when configuring a system using an embodiment of the present invention.

Referring now to FIG. 1, a system diagram is provided that shows components that may be used in a system 100 when implementing an embodiment of the present invention, and interactions among those components. In this example, the components and interactions are directed primarily to an embodiment that configures an assembly of software components. (The components and interactions shown in FIG. 1 are provided by way of illustration, but not of limitation, and an embodiment of the present invention may be implemented using fewer, additional, or different components without deviating from the scope of the present invention.)

A User Interface component 110 provides for interacting with a user of an embodiment of the present invention, such as a software architect, software designer, or software developer (where personnel in these various roles are referred to generally herein as "software development personnel" or "software developers" for ease of reference). The user interaction may comprise, by way of example, submitting a model, retrieving results, and/or setting various selection criteria.

A Controller component 120 serves as a director, controlling the flow as to where the processing of an embodiment of the present invention should go next. The Controller component 120 receives requests from the User Interface component 110 and then decides which other components and functions to bring together to complete the task at hand. The Controller component 120 may request execution of rules by the Rule Engine component 130, for example, or may invoke Model Parser/Generator component 140 to convert an incoming model or generate a results model.

A Rules Engine component 130 provides a mechanism for interpreting the structure of an incoming architecture specification and choosing pre-built components that match this architecture, which may include consideration of a user's selection criteria (which may be supplied from User Interface component 110). The Rules Engine component 130 preferably retrieves component-specific information from Component Definition Data Store component 170 and uses that information when executing rules that select appropriate pre-built components or suggest appropriate custom components that could fill the need as defined by the inbound (i.e., target) architecture specification. (An "appropriate" component is one that provides a complete or partial match, as determined by an embodiment of the present invention and as discussed in further detail below.)

The Rules Engine component 130 preferably retrieves existing rules from a Rules Definition repository 150. Preferably, the rules fall into one or more of the following categories:

(1) Resource-constraining or resource-consumption rules. As an example, a rule in this category might specify that a particular component "ABC" requires some amount of processor and/or storage capacity when it executes. As another example, a rule in this category might specify that component "ABC" consumes data provided in any of formats P, Q, or R and provides its output in a format Z. (As will be readily understood, more than one rule may be provided for a single component.)

(2) Prerequisite or co-requisite checking rules. As an example, a rule in this category might specify that if a particular component "DEF" is selected for inclusion in the system assembly, then additional components "GHI" and "JKL" are also needed and must be selected for inclusion in the system assembly.

(3) Mutually exclusive selection rules. As an example, a rule in this category might specify that if a particular component "MNO" is selected for inclusion, then a component "PQR" cannot be used in the system assembly.

A Model/Parser Generator component 140 is responsible for conversion between an external model format provided to the system 100 and a format that is understandable by the Rules Engine component 130. Conversion of the incoming model format preferably comprises parsing the incoming architectural model specification (which may be submitted, or otherwise identified, by an architect using the User Interface component 110). Generating an output or results model preferably comprises retrieving, from Component Definition Data Store component 170, an assembled a list of components that have been iteratively selected using techniques disclosed herein.

In addition to storing and providing the above-discussed assembled list of components, the Component Definition Data Store component 170 also preferably retrieves component information stored in a Component Data repository 180, where this stored component information preferably contains detailed definitions for the various components that are available for selection. Once retrieved from Component Data repository 180, this component information is preferably provided by the Component Definition Data Store component 170 to the Rules Engine component 130 for use with rules that evaluate whether particular components should be selected for inclusion in the assembly. The component information stored in Component Data repository 180 preferably includes attributes/metadata that describe component characteristics and which can be used to select one or more components that match requirements for a particular system assembly. Examples of the descriptive component information that may be stored in Component Data repository 180 include:

(1) Resources consumed by this component. As one example, this might be expressed as one or more input parameters used by the component during execution. As another example, this might be expressed as processing power that is required for this component.

(2) Resources generated by this component. As one example, this might be expressed as output parameter information which will be returned by the component during execution.

(3) Software and/or hardware environments with which this component is compatible. This may be expressed, for example, as one or more environments that are supported or as one or more environments that are required, such as specifying a list of function libraries and/or executables that must be loaded prior to execution of the component.

(4) Cost of ownership for this component. This may be expressed, for example, as a cost of licensing a component, the cost of purchasing a component, a specification of whether charges associated with the component are ongoing or one-time charges, and so forth.

(5) Execution schedule information pertaining to this component. This may be expressed, for example, with reference to the frequency and/or manner in which this component responds to requests—such as whether this component is loaded on demand (and perhaps metrics pertaining to the load time), whether the component is always available in an implementation, whether the component operates in real-time or batch mode, and so forth.

(6) Various scores/ratings relating to this component. These may pertain, for example, to component stability, usability, reliability, and/or extensibility.

A Rules Builder component 160 may be provided to facilitate adding/changing/deleting the rules in Rules Definitions repository 150. For example, it may be determined during use of an embodiment of the present invention that one or more existing rules should be changed in order to provide an improved solution. A user who updates the Rules Definition repository 150 using a Rules Builder component 160 is referred to in FIG. 1 as a Rules Modeler 165.

A Component Definition Maintenance component 190 may be provided to facilitate adding/changing/deleting the descriptive component information that is stored in Component Data repository 180 and is used by the Rules Engine component 130 when selecting components for assembly. For example, it may be determined during use of an embodiment of the present invention that one or more additional components are now available for selection and should therefore be reflected in Component Data repository 180, or that the descriptive component information stored in Component Data repository 180 for an existing component needs to be revised. A user who updates the Component Data repository 180 using a Component Definition Maintenance component 190 is referred to in FIG. 1 as a Component Modeler 195.

Referring now more generally to use of an embodiment of the present invention, it will be understood that an architectural model of a system is generally specified in terms of components, their associations, and their interactions with other components. A model may be specified using a combination of structural views (or logical views), behavioral views (or process views), and operational views. The well-known Unified Modeling Language, or "UML", is commonly used to define such models. Tools for model definition in UML are commercially available, and include the Rational® Software Architect (hereinafter, "RSA") from International Business Machines Corporation. ("Rational" is a registered trademark of International Business Machines Corporation in the United States, other countries, or both.)

When using UML to define a model, the structural view may be specified using classes or components using generic relationships, or may be specified using more specific associations, dependencies, generalizations, or realizations. Behavioral views may be specified using sequences, collaborations, or activities. Operational views may be specified with nodes, deployable units or artifacts, and components associated with the units. (It should be noted, however, that reference herein to using UML is by way of illustration and not of limitation, and other techniques for specifying an architectural model may be used without deviating from the scope of the present invention.)

When an embodiment of the present invention analyzes an inbound architectural model specification, the elements of the architecture and the views in which these elements are organized are determined. When using UML, this analysis preferably comprises parsing the UML to locate the components of the model and their constituent attributes and methods, and placing that information into an index for subsequent use. From sequences, component interactions are determined and placed into the index. Similarly, node and artifact associations of components are determined and added to the index.

Figure 2:
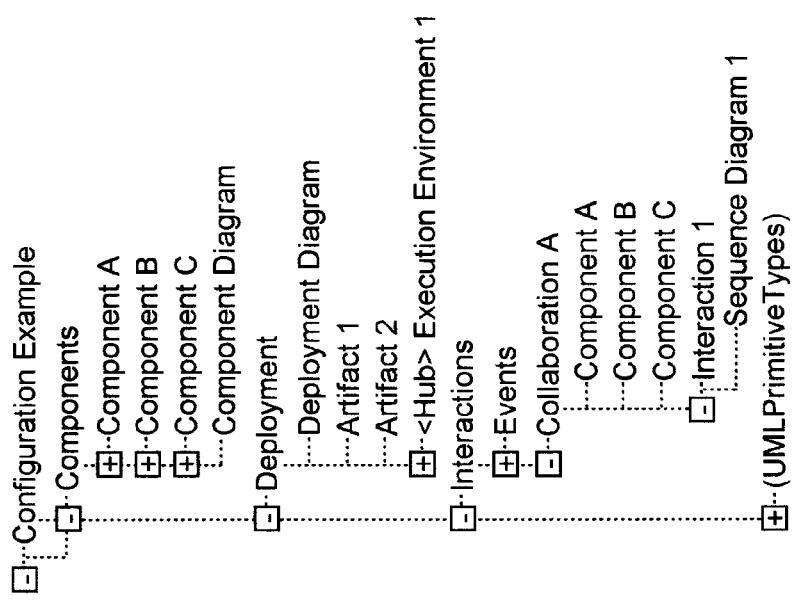
FIG. 2 shows a sample model structure which may be provided as input to an embodiment of the present invention.
Figure 3:
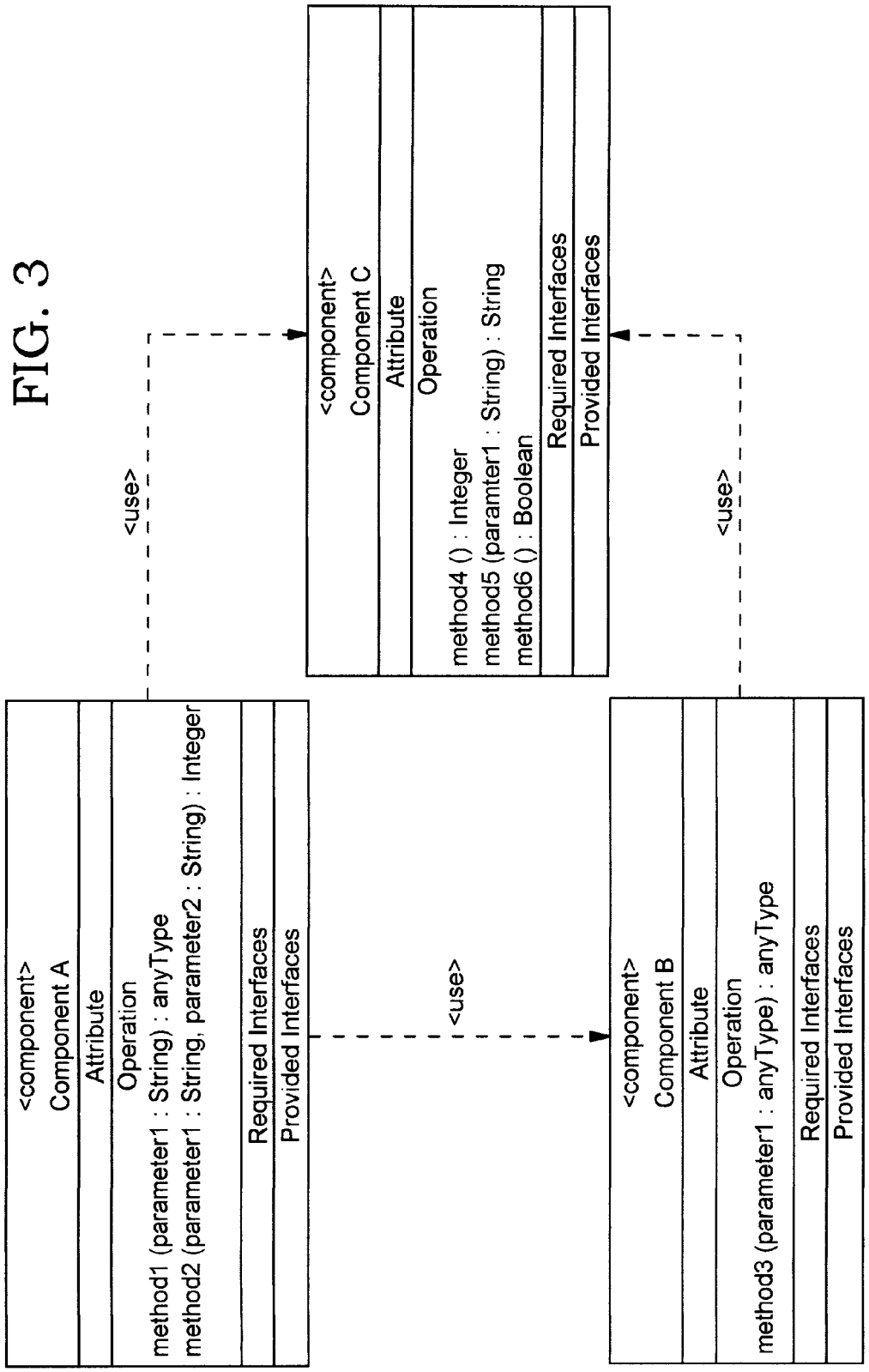
FIGS. 3-5 provide sample structural, behavioral, and operational views, respectively, that expand on the model structure of FIG. 2.
Figure 4:
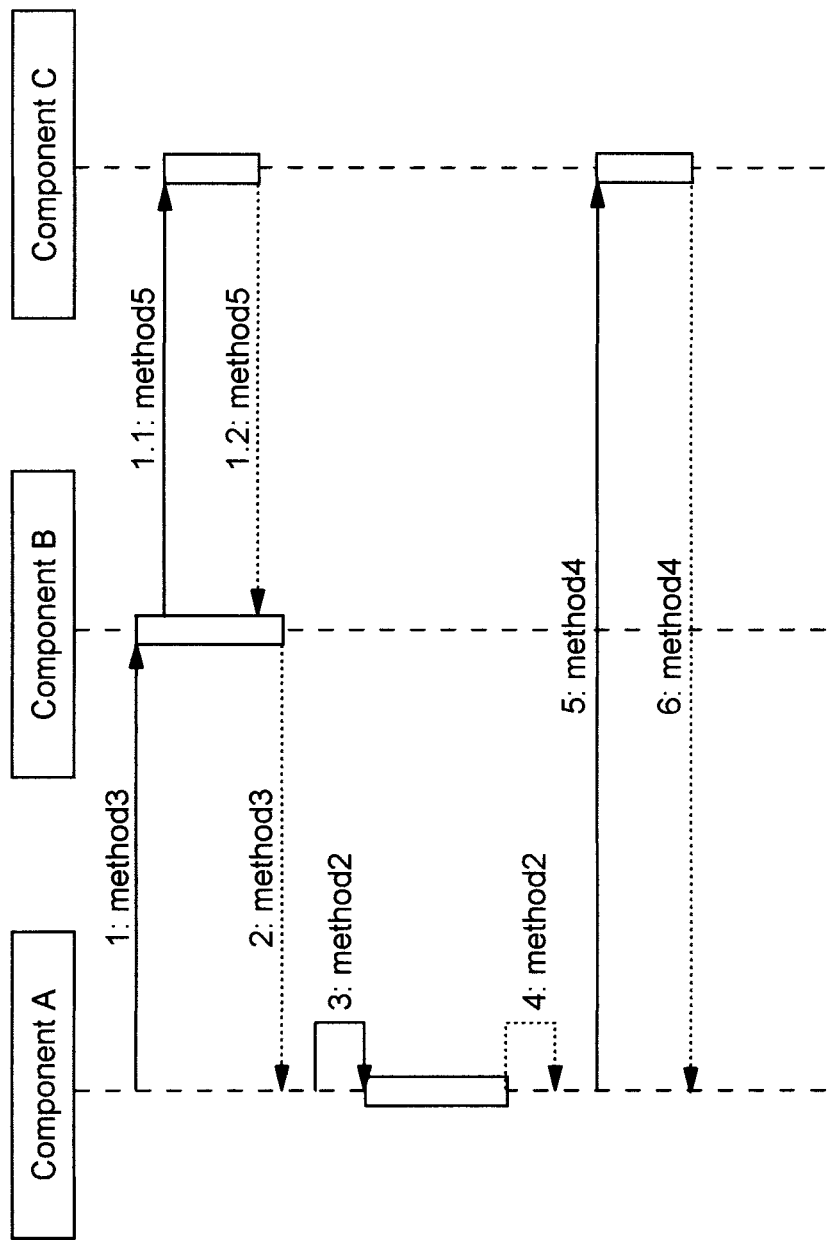
Figure 5:
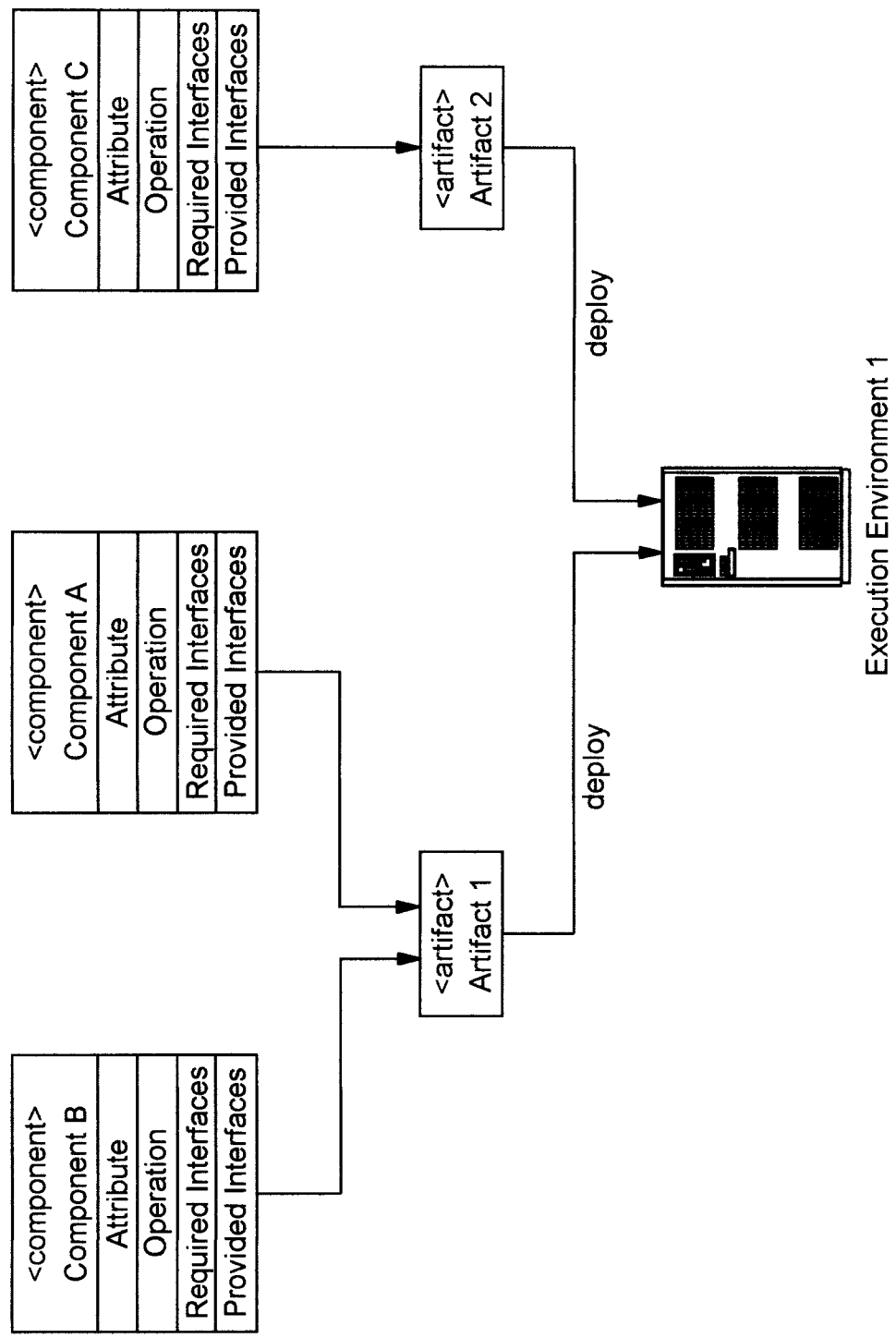

Consider, as an example, the model structure 200 shown in FIG. 2. This is an example of a model structure that might be created using the above-noted RSA product. This supplied model specification 200 indicates that the system to be assembled consists of three components, and in the example specification 200, placeholders for these three components are represented as "Component A", "Component B", and "Component C". (An embodiment of the present invention determines actual components that can be used for each of the placeholders, as discussed in more detail herein.) The supplied model specification 200 also indicates, for each of the three components (of the example), their associations, their interactions, and their deployment, as will be readily understood by those of ordinary skill in the art. (In an embodiment of the present invention, the incoming model specifications preferably adhere to a predefined meta-model, where this meta-model is known to Model Parser/Generator Component 140.) The diagrams in FIGS. 3-5 provide views that expand on the model structure of FIG. 2, and will now be discussed. (Note that the views in FIGS. 3-5 are provided by way of illustration and not of limitation, and an embodiment of the present invention is not limited to use with an inbound model consisting of these particular views.)

FIG. 3 provides a structural view of the sample model 200. As shown therein, Component A has 2 methods, which are named "method1" and "method2". As also shown in FIG. 3, "method1" uses an input parameter of string type and returns a value in any type, while "method2" uses 2 input parameters of string type and returns an integer. Component B is shown in FIG. 3 as having a single method, which is named "method3" and which uses an input parameter of any type and returns a value in any type. Component C is shown in FIG. 3 as having 3 methods, which are named "method4", "method5", and "method6". FIG. 3 also shows that "method4" returns an integer; "method5" uses an input parameter of string type and returns a string value; and "method6" returns a Boolean value.

FIG. 4 provides a behavioral view of the sample model 200. This behavioral view provides a graphical illustration of how the components interact through method invocation.

FIG. 5 provides an operational view of the sample model 200. As is readily understood by those of ordinary skill in the art, an artifact represents some physical piece of information. Artifacts are sources for deployment. Accordingly, FIG. 5 indicates that Components A and B are physically realized within the artifact illustrated as "Artifact 1", while Component C is physically realized within the artifact illustrated as "Artifact 2". FIG. 5 also indicates that both Artifact 1 and Artifact 2 are deployed into the depicted "Execution Environment 1".

FIG. 6 provides a sample index 600 corresponding to the sample model 200, where this index 600 contains entries for information extracted from the model specification. As can be seen by inspection, index 600 contains entries for each of the components of the example, each of their methods, behavioral information, and operational information.

An embodiment of the present invention preferably uses keyword or concept extraction (discussed hereinafter with reference to keywords, for ease of reference), whereby various constituent parts of the supplied model specification have keywords associated therewith. Each component may be assigned one or more keywords, for example, that represent desired characteristics of that component. Links between components may be assigned one or more keywords to describe desired relationships between the components. Interactions between components may be assigned one or more keywords to describe the desired behaviors. Deployment target associations may be assigned one or more keywords to describe desired containment. In an alternative approach, an embodiment of the present invention may support requirements that are attached to the various modeling elements. The RSA product, for example, supports the ability to associate requirements to modeling elements, where those requirements are defined using the Rational® Requirements Composer product of International Business Machines Corporation. Other modeling tools may provide similar attachment or annotation capability. In yet another alternative approach, an embodiment of the present invention may support use cases that embody requirements for modeling elements. Using UML, modeling elements may then be associated with use cases via realizations.

An embodiment of the present invention extracts the keywords attached to, or otherwise associated with, the modeling elements and places those keywords at a corresponding location in the index. (Addition of keywords to the index has not been depicted in the sample index 600 of FIG. 6, although it will be obvious to one of ordinary skill in the art, in view of the disclosure provided herein, how this index augmentation may be provided.) If requirements are associated with modeling elements, then keywords are extracted from these requirements using known techniques, and are placed in the index. Additionally, if documentation is attached to the modeling elements, then keywords are similarly extracted and added to the index.

While architectural artifacts discussed above primarily describe the behavioral aspects needed in the system being assembled, other characteristics of the system that may need to be considered are not functional in nature. Examples of such non-functional characteristics include response time, availability, transaction volume, quantity of data, quality of service, and other indicators. More generally, non-functional characteristics may describe key performance indicators needed from the components that are selected for assembly. In an embodiment of the present invention, non-functional characteristics may be described using attributes of the supplied architectural model—for example, through additional keywords that are associated with the model and that are then extracted and placed into the keyword index.

Preferably, a predefined meta-language is used for specifying keywords and associated values for the architectural model and for the software components, allowing a software architect to clearly describe what is needed in the system being assembled and also allowing software developers to clearly characterize what is provided by each of the various existing software components.

In the general case, the keywords associated with a software component may specify a wide variety of information, and this information may then be used in an automated manner by the Rules Engine component 130 (as well as Component Definition Data Store component 170 and Component Data repository 180) of FIG. 1 during the processing of configuration rules. Examples of this information include, by way of illustration but not of limitation, the following:

a list of other components with which this particular component is known to be compatible;
a list of other components that are prerequisites (or co-requisites) for this particular component; and
service level agreement or quality metrics of this particular component.

As an example of using keywords (and their corresponding values, referred to generally herein simply as keywords) to describe characteristics of a software component, consider a hypothetical component that can be invoked to render a graph as a diagram on a user interface. Suppose that this component uses a Java® Server Faces (hereinafter, "JSF") implementation to perform the rendering, meaning that various Java services from the JSF implementation must be in place in the assembled system if this component is to function therein. ("Java" is a registered trademark of Oracle Corporation in the United States, other countries, or both.) FIG. 7 provides an example of a syntax specification 700 that may be used to describe characteristics of the hypothetical software component (where this syntax specification 700 may be stored, for the hypothetical software component, in Component Data repository 180 of FIG. 1). In this example, the component name "MyGraphRenderer" is specified at 710, and particular attributes of this component are specified at 720. For example, the attributes syntax 720 specifies that this component requires either version 1.5 or 1.6 of the Java runtime environment (having keyword "java-version", in this example), either version 1.2 or 2.0 of the JSF software (having keyword "jsf-version"), and version 5 of the Java platform (having keyword "jee-version"). Note that the attribute syntax 720 may be interpreted as specifying prerequisite components. Co-requisite components for the hypothetical graph renderer component are identified in the syntax at 730, and the syntax at 740 provides a list of components that are incompatible with the hypothetical graph renderer component. Finally, the syntax at 750 specifies quality metrics for the hypothetical graph renderer component, which in this example are reliability and usability metrics.

Optionally, weighting factors (i.e., weights) can be applied to the non-functional characteristics in order to filter or prioritize the applicability of existing software components during the component evaluation process. In one approach, values of weighting factors can be set by a user (for example, from User Interface component 110 for the model that is being submitted) to reflect the user's perspective as to which attributes are most important. Values of the weighting factors will impact the execution of the rules used in selection of components to fulfill the requirements of the inbound model specification. The weighting factor values also allow for the user to obtain a potential solution that is more tailored to the user's particular environment.

As an example of using weights, weighting may be used to give priority, from among a plurality of candidate software components that provide a needed function, to one of the components that has better reliability or that is capable of supporting a higher volume of transactions. Use of weighting factors is discussed in more detail below.

Figure 8:
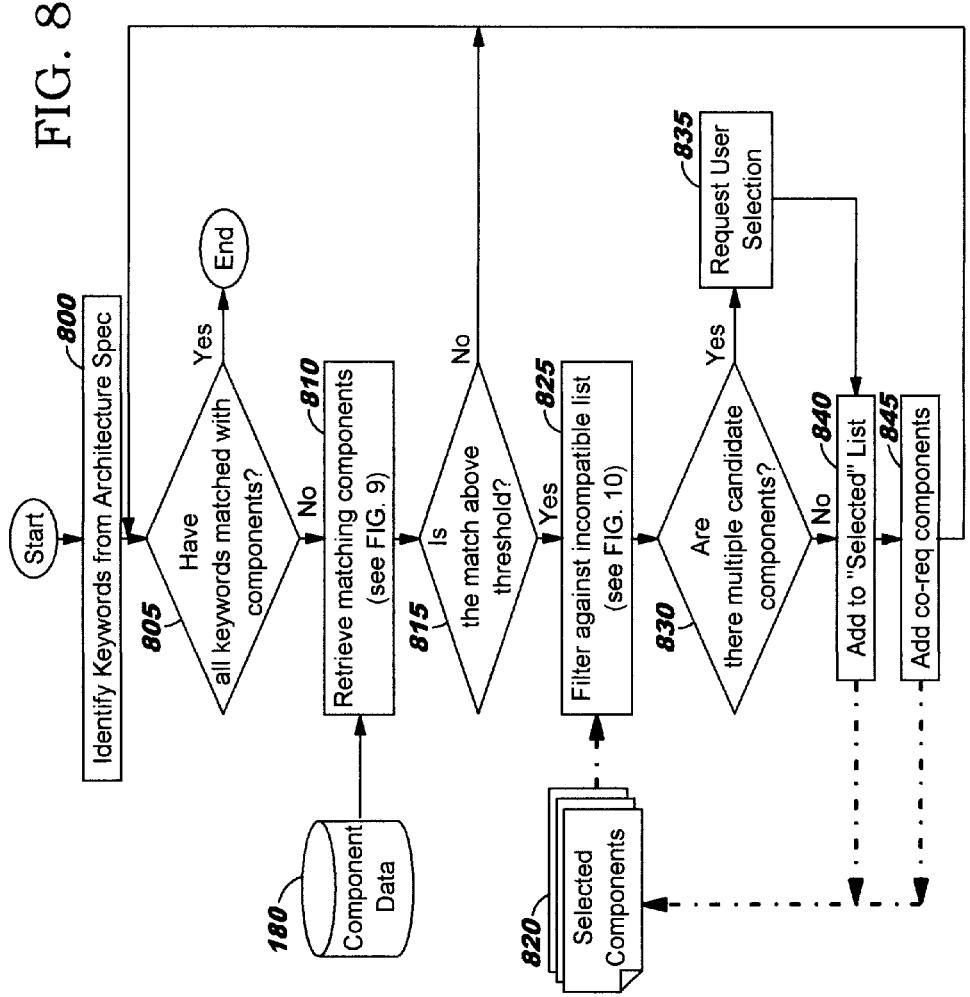
FIGS. 8-10 provides flowcharts depicting logic which may be used when implementing an embodiment of the present invention.
Figure 9:
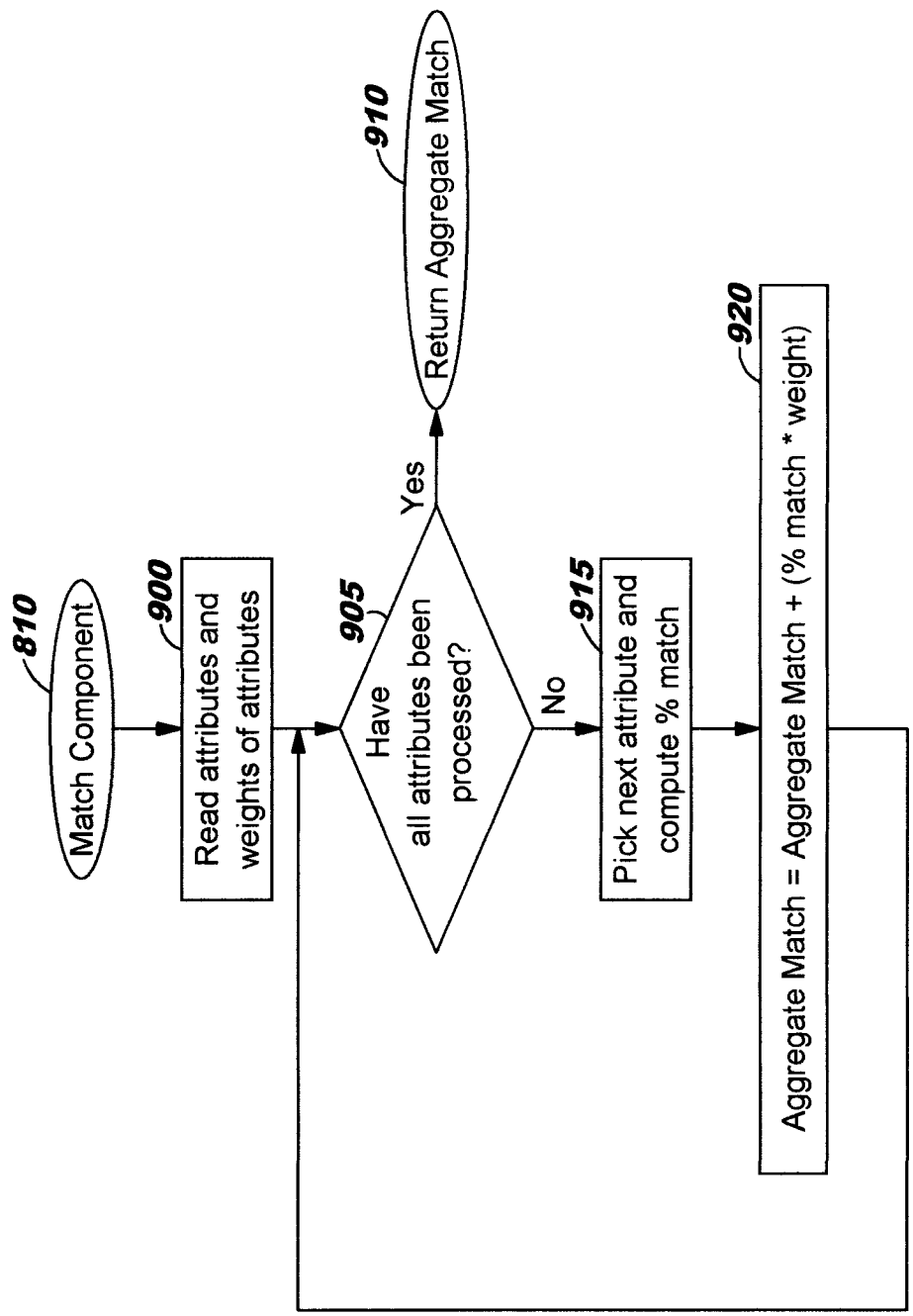
Figure 10:
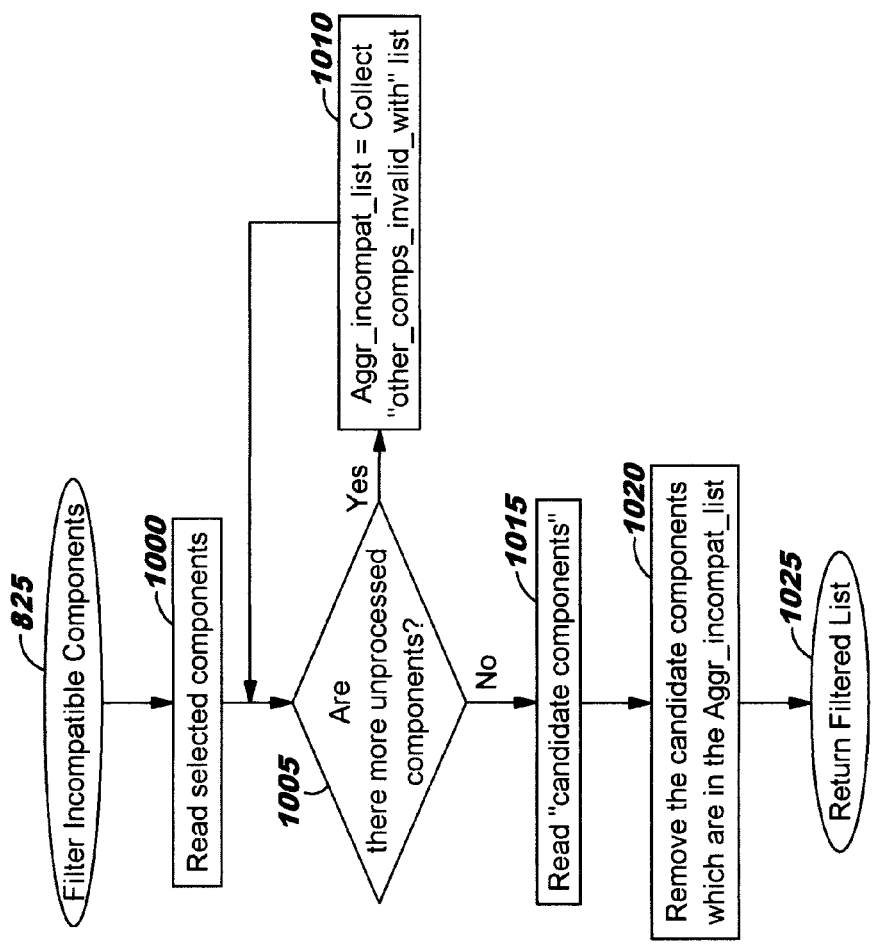

Referring now to FIGS. 8-10, flowcharts are provided therein depicting iterative processing logic which may be used when implementing an embodiment of the present invention. (This processing may be performed, at least in part, by Rules Engine 130 of FIG. 1, although this is by way of illustration and not of limitation.)

The processing of an inbound architectural model specification begins at Block 800 of FIG. 8 (where this specification may be obtained, for example, using an address, identifier, or file name supplied by a user from User Interface component 110 of FIG. 1) by identifying the keywords that are associated with the model. As has been discussed above, an index is preferably built from these keywords (although another type of data structure may be used without deviating from the scope of the present invention), enabling an embodiment of the present invention to match these keywords against keywords which have previously been specified for the available software components.

Block 805 tests whether all of the keywords of the model have been matched with components—in other words, whether the component selection process has been completed. If this test has a positive result, then the processing of FIG. 8 ends. Results information may be presented to the user (not shown in FIG. 8). This may comprise displaying a list of components on with User Interface component 110, printing a component list that identifies each component to be used in assembling the system, invoking a system builder application that uses such list to package components together for storage on a recordable medium, etc. Otherwise, when the test at Block 805 has a negative result, then the model specification has not yet been completely processed, and control transfers to Block 810.

Matching components for a particular keyword from the model are retrieved at Block 810. This preferably comprises determining, from the available software components, which one or ones have associated attributes that match (either completely or partially) this particular keyword from the model specification. This preferably comprises using the keyword as an index to access Component Data repository 180 (which was also discussed above with reference to FIG. 1), which contains descriptive component information for each of the available components. The component(s) retrieved at Block 810 are considered as candidates for fulfilling the requirements of a component placeholder in the architectural model specification, and the subsequent processing of FIG. 8 (and invoked FIGS. 9 and 10) is directed to selecting one of these candidates.

As noted above, the keywords from the model specification and from the software components are used to determine which components are considered a match. To facilitate efficient comparison, the same structural approach is preferably used when specifying the keywords for the model and when specifying the keywords associated with the software components. (In an alternative approach, a conversion process may be performed to convert keywords stored in a different form into keywords that can be compared more efficiently.) By way of illustration but not of limitation, the example syntax 700 of FIG. 7 uses a "name={value(s)}" approach for specifying keywords in elements 720-750. Alternative representations may be used without deviating from the scope of the present invention. As one example, keywords might be formed by a concatenation of an attribute name and its corresponding value, such as using the syntax "quality_metrics_reliability_0.8" and "quality_metrics_usability_0.7" instead of the syntax shown at 750 of FIG. 7. References herein to "keywords", and to keywords and their associated values or metrics, are therefore intended to encompass such various alternatives.

The processing of Block 810, whereby one or more matching components are retrieved for a particular keyword, is illustrated in further detail in FIG. 9. In Block 900, the Component Definition Data Store component 170 (not separately shown in FIG. 9) preferably reads all attributes, and optional weighting factors of those attributes, for a matching component from Component Data repository 180. Block 905 then tests whether all attributes of a currently-processed component have been processed. If this test has a positive result, meaning that all of the attributes have already been processed, then control transfers to Block 910 which returns an aggregated match value (see the discussion of Block 920, below) to the invoking logic in FIG. 8.

When the test at Block 905 has a negative result, on the other hand, then there are still more attributes to process for this component. Processing therefore continues at Block 915 to process another one of such attributes.

An embodiment of the present invention is preferably configured for handling complete matches as well as partial matches. An exact match is found when every aspect of the available component, according to the corresponding information stored in Component Data repository 180, matches the component that is needed for the inbound architectural model specification. A partial match is found when an available component cannot fully deliver what is requested in the model specification, but can deliver a part of what is requested. Keywords may have different weighting factors associated therewith, as noted earlier, and these weighting factors can be used to represent the relative importance of a particular attribute. The weighting factors allow programmatically determining which component, from among several available components, will provide a better match. Accordingly, Block 915 obtains the next attribute of a component that provides at least a partial match, and applies the corresponding weighting factor to yield a score for this attribute of this component. (If an embodiment of the present invention does not support weighting factors, then the processing of Block 915 may be thought of as using a multiplier of 1.)

Suppose, for example, that the hypothetical graph rendering component that was discussed above with reference to FIG. 7 is being evaluated. Further suppose that attribute list 720 is being compared to a set of requirements that specifies a Java version of 1.5, a JSF version of 1.1, and that does not include (for this example) any other Java-related requirements. Accordingly, the Java version of the hypothetical component is a match, but the JSF version is not. The hypothetical component may therefore be considered, by the processing at Block 915, as a 50 percent match to this set of requirements.

Block 920 computes an aggregate match value, which preferably comprises adding the value obtained at Block 915 to a cumulative value that represents the sum of all processed attributes for this component. Processing then returns to Block 905 to determine whether there are additional attributes to be processed for this component.

As an example of the operation of Block 920, suppose that attributes A1 and A2 are specified for a particular component, and that the weighting factors associated with these attributes are 0.7 and 0.3, respectively. Further suppose that Block 915 determined that neither attribute is a complete match to requirements, and instead, attribute A1 is a 40 percent match while attribute A2 is a 50 percent match. The aggregate match for this particular component is then computed at Block 920 as follows:

(weight *of A1*\*percent match *of A1*)+(weight *of A2*\*percent match *of A2*)

which equates to (0.7\*0.4)+(0.3\*0.5), or 0.43. This aggregate match value of 0.43 may then be compared against the aggregate match value of one or more other candidate components to choose one that is preferred for inclusion in the assembly.

Returning now to the discussion of FIG. 8, when processing returns to Block 815 from FIG. 9, the aggregated match value is tested at Block 815 to determine whether it exceeds a predetermined threshold value. It may be desirable, for example, to discard any component selection for which the aggregated match value is less than 25 percent (or perhaps less than 50 percent; the particular value to use for the threshold is situation-specific). Accordingly, if the test at Block 815 has a negative result, then this component is not selected for inclusion. Instead, processing returns to Block 805 to determine whether there are any keywords still to be matched with components; otherwise, processing continues at Block 825. (Note that a particular component may fail the threshold test at Block 815 after evaluation of some portion of its attributes, but may pass this test successfully if additional keywords are subsequently evaluated and yield a better aggregate match value.)

Block 825 performs a filtering process, which is described in further detail in FIG. 10. Block 1000 of FIG. 10 begins this filtering process by reading the list 820 (creation of which is shown in FIG. 8) of components which have been selected for inclusion in the system assembly. Block 1015 tests whether there are more components from list 820 that have not yet been processed—that is, for which the filtering of FIG. 10 has not yet been performed. If this test has a positive result, then processing continues at Block 1010; otherwise, control transfers to Block 1015.

Block 1010 preferably obtains, from the descriptive component information stored in Component Data repository 180 for the component that is currently being processed, the specification of other incompatible components. See 740 of FIG. 7, where an example format for such specification is presented. This component-specific incompatibility information is preferably added to an aggregated list of all incompatible components for the assembly which is being determined by the processing of FIGS. 8-10. Control then returns to Block 1005 to determine whether there are any more components from list 820 that have not yet been processed by the logic of FIG. 10.

Block 1015 is reached when the component-specific incompatibility information has been retrieved, and added to the aggregated list, for all selected components from list 820. Block 1015 obtains a list of the candidate components, as determined by the previous processing of FIGS. 8-10. Block 1020 then removes, from this list of candidates, any which are identified on the aggregated list of all incompatible components for the assembly—i.e., the list that was created at Block 1010. This filtered list is then returned (see Block 1025) to the invoking logic of FIG. 8.

Returning again to the discussion of FIG. 8, Block 830 tests whether there are multiple candidate components for fulfilling a particular requirement of the architectural model. If not, then processing continues at Block 840; otherwise, processing continues at Block 835.

Block 835 resolves which of multiple candidate components should be selected. In one approach, the list of candidates is presented to the user (for example, with User Interface component 110 of FIG. 1). This presentation to the user may describe one or more of the attributes associated with each candidate component. In addition or instead, a cost factor associated with each candidate component may be presented to the user (and in one approach, the cost factor is merely one of the attributes associated with a candidate component, and is therefore always presented to the user if such cost information is available).

In one embodiment, the candidate components are presented to the user in an order according to how closely that candidate matches requirements. (In another embodiment, the user may be allowed to configure the order in which the candidates are presented for the user's review and selection.) For each candidate component that is a complete match, the user may be presented with a selection choice for that candidate component, where this presentation may include further information (such as the cost of the component, as noted above) to assist the user in making a selection. The components that are a partial match are preferably presented as a list that is sorted based on the percentage match value (see the discussion of Block 915, above).

Once the user's selection among the candidate components is received (or when there were not multiple candidates from which to select), processing reaches Block 840, which adds the selected component to a list 820 of selected components. In other words, as the user makes selections, the supplied architectural specification (or a corresponding specification) is preferably updated to replace each placeholder component with the corresponding selected component. (While the selected components represented by reference number 820 are described herein as being stored in a list, this is by way of illustration and not of limitation; a different type of data structure may be used without deviating from the scope of the present invention.)

Control then reaches Block 845, which determines any co-requisite components of the component which has been added to the selected components list 820 by the processing of Block 840. Such determined components are then also added to the selected components list 820 at Block 845. (Note that processing of prerequisite components has already been accounted for during the selection and filtering processes of FIGS. 8-10, according to a preferred embodiment of the present invention.) Control then returns to Block 805 to determine whether there are additional keywords from the architectural model that have not yet been processed.

It will be appreciated that an iterative process to component evaluation and selection is disclosed herein, and that as an available component is selected to fulfill the requirements of each placeholder in the inbound architectural model, some selections may impact one another. For example, inclusion of a particular component might require design or requirement changes, which will effectively result in a new architectural model. This may be especially likely when candidate components are partial matches instead of complete matches. The user preferably feeds the revised architectural model back into an embodiment of the present invention, which then re-evaluates the model specification in view of the available components. In one approach, the user may make revisions to the model specification after each partial match selection. Or, the revisions may be made following selection of multiple components.

It should also be noted that there may be instances where no candidate component is identified when evaluating the available components. The user may be apprised of this non-resolved component situation, for example by displaying a message on User Interface component 110. In one approach, the user will modify the model specification and repeat the evaluation processing in view of this revised model specification. In another approach, an estimate of time and/or materials for building a custom component may be provided to the user for each non-resolved component. (In this latter approach, a predefined data structure may be consulted, by way of example, to retrieve information on expected component-building rates.)

Figure 11:
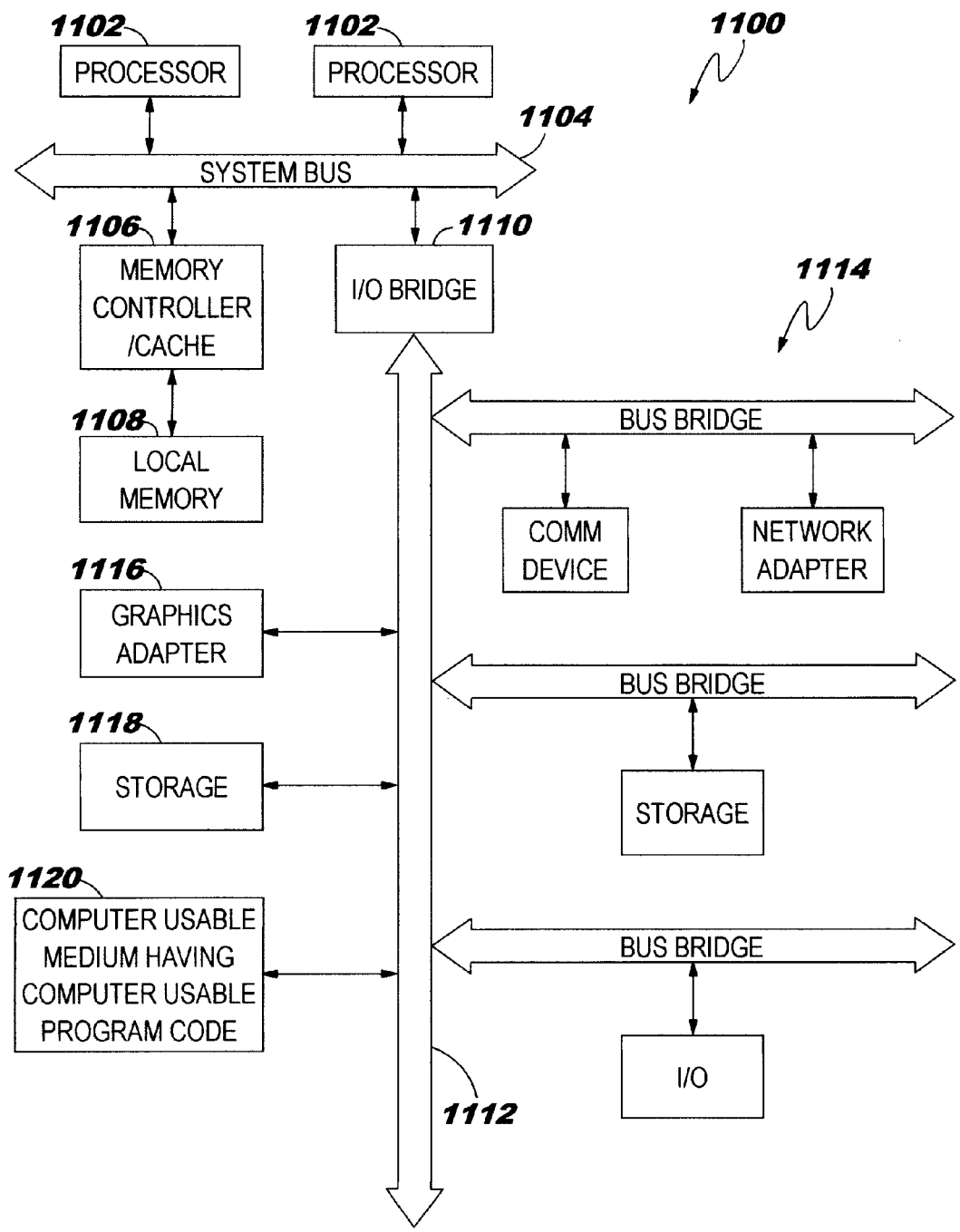
FIG. 11 depicts a data processing system suitable for storing and/or executing program code.

Referring now to FIG. 11, a block diagram of a data processing system is depicted in accordance with the present invention. Data processing system 1100, such as one of the processing devices described herein, may comprise a symmetric multiprocessor ("SMP") system or other configuration including a plurality of processors 1102 connected to system bus 1104. Alternatively, a single processor 1102 may be employed. Also connected to system bus 1104 is memory controller/cache 1106, which provides an interface to local memory 1108. An I/O bridge 1110 is connected to the system bus 1104 and provides an interface to an I/O bus 1112. The I/O bus may be utilized to support one or more buses 1114 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1116, storage 1118, and a computer usable storage medium 1120 having computer usable program code embodied thereon. The computer usable program code may be executed to execute any aspect of the present invention, as have been described herein.

The data processing system depicted in FIG. 11 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 12:
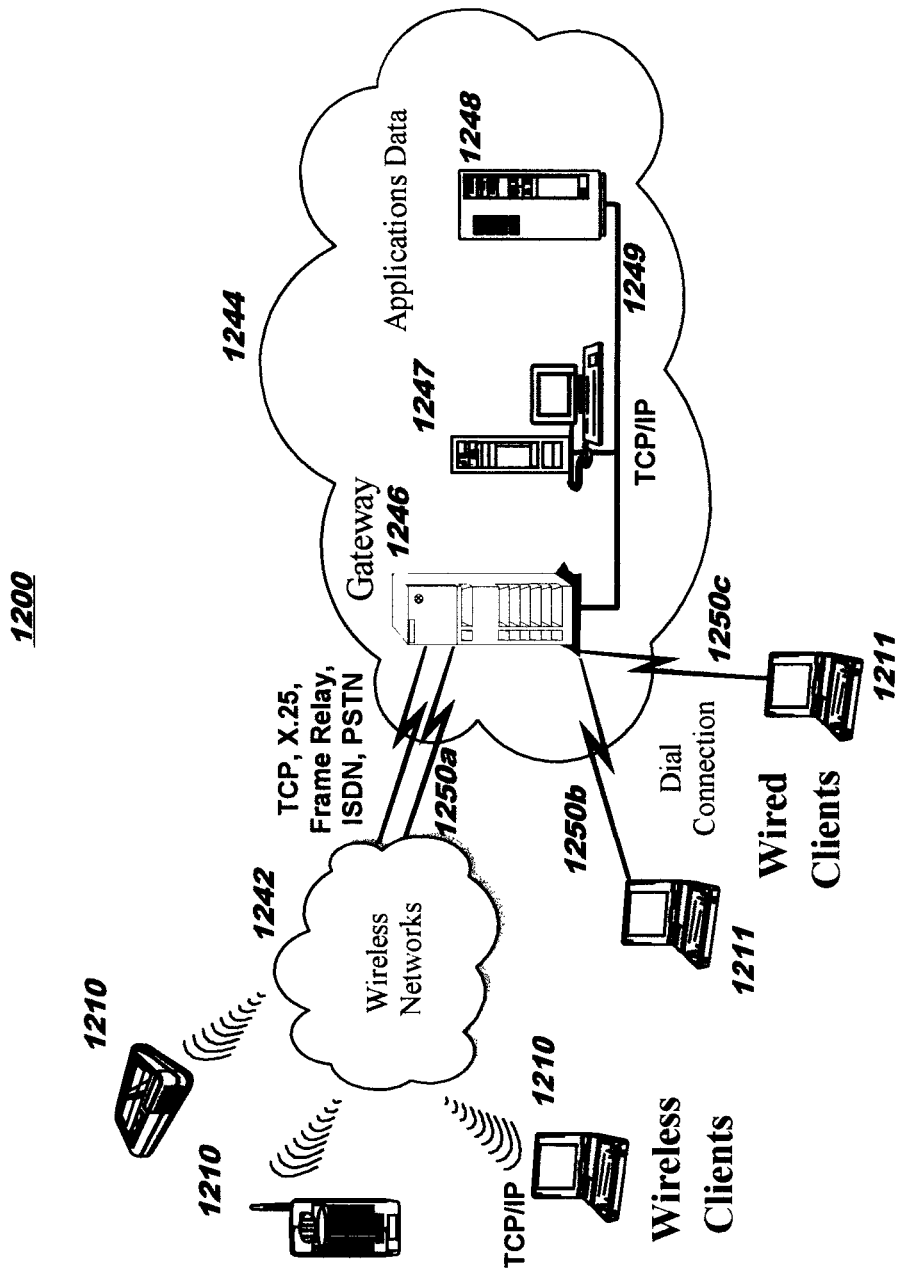
FIG. 12 depicts a representative networking environment in which one or more embodiments of the present invention may be used.

FIG. 12 illustrates a data processing network environment 1200 in which the present invention may be practiced. The data processing network 1200 may include a plurality of individual networks, such as wireless network 1242 and wired network 1244. A plurality of wireless devices 1210 may communicate over wireless network 1242, and a plurality of wired devices, shown in the figure (by way of illustration) as workstations 1211, may communicate over network 1244. Additionally, as those skilled in the art will appreciate, one or more local area networks ("LANs") may be included (not shown), where a LAN may comprise a plurality of devices coupled to a host processor.

Still referring to FIG. 12, the networks 1242 and 1244 may also include mainframe computers or servers, such as a gateway computer 1246 or application server 1247 (which may access a data repository 1248). A gateway computer 1246 serves as a point of entry into each network, such as network 1244. The gateway 1246 may be preferably coupled to another network 1242 by means of a communications link 1250a. The gateway 1246 may also be directly coupled to one or more workstations 1211 using a communications link 1250b, 1250c, and/or may be indirectly coupled to such devices. The gateway computer 1246 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 1246 may also be coupled 1249 to a storage device (such as data repository 1248).

Those skilled in the art will appreciate that the gateway computer 1246 may be located a great geographic distance from the network 1242, and similarly, the devices 1210, 1211 may be located some distance from the networks 1242 and 1244, respectively. For example, the network 1242 may be located in California, while the gateway 1246 may be located in Texas, and one or more of the devices 1210, 1211 may be located in Florida. The devices 1210 may connect to the wireless network 1242 using a networking protocol such as the Transmission Control Protocol/Internet Protocol ("TCP/IP") over a number of alternative connection media, such as cellular phone, radio frequency networks, satellite networks, etc. The wireless network 1242 preferably connects to the gateway 1246 using a network connection 1250a such as TCP or User Datagram Protocol ("UDP") over IP, X.25, Frame Relay, Integrated Services Digital Network ("ISDN"), Public Switched Telephone Network ("PSTN"), etc. The devices 1211 may connect directly to the gateway 1246 using dial connections 1250b or 1250c. Further, the wireless network 1242 and network 1244 may connect to one or more other networks (not shown), in an analogous manner to that depicted in FIG. 12.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method for configuring a set of components to assemble a system, comprising using a processor of a computer to perform:

obtaining an architectural model specification that describes a plurality of elements to be assembled for realizing requirements of the system and that associates the requirements with corresponding ones of the plurality of elements, wherein each of the requirements is specified using at least one keyword associated with the corresponding ones of the elements in the model specification;

iteratively processing each of the described elements to select a set of components that matches the requirements to be realized for the system, further comprising:

identifying, for the described each element, each of the at least one keyword associated therewith in the model specification;

extracting each of the identified at least one keyword from the model specification;

placing each extracted keyword into an index corresponding to the model specification;

using each indexed keyword to locate, in a component data repository that stores attribute information for each of a plurality of components available for selection for the assembly, each of at least one of the available components for which the stored attribute information contains the indexed keyword, wherein at least one of the indexed keywords locates a plurality of the available components;

responsive to locating the plurality of the available components, performing a selection process to select a particular one of the plurality of located components as matching the requirements associated with the described each element, and otherwise selecting a single one of the located components as matching the requirements associated with the described each element, wherein the selection process comprises providing, to a user, at least a portion of the stored attribute information for each of the located plurality of components and receiving a selection, from the user, of the particular one and wherein the stored attribute information provided to the user comprises a cost factor for each of the located plurality of components;

adding the selected available component to an aggregated list of selected components for the assembly; and adding, to the aggregated list, any of the available components which are identified, in the stored attribute information for the selected available component, as being co-requisites of the selected available component;

removing, from the aggregated list, any of the selected components which are determined to be incompatible with at least one other one of the selected components, thereby creating an updated aggregated list of selected components; and providing the updated aggregated list of selected components as input to a system builder application that uses the provided list to package the selected components together for assembling the system.

2. The method according to claim 1, further comprising removing, from the plurality of located components prior to performing the selection process, any of the plurality of located components for which a predetermined match threshold is not exceeded in the locating.

3. The method according to claim 1, wherein:
the adding the selected available component to the aggregated list further comprises adding, to an incompatibility list, an identification of any of the available components identified in the stored attribute information for the selected available component as being incompatible with the selected available component; and
the removing any of the selected components which are determined to be incompatible further comprises removing any of the selected components which are identified in the incompatibility list.

4. The method according to claim 1, further comprising providing, for the configured assembly, the cost factor for each of the selected components in the updated aggregated list.

5. The method according to claim 1, further comprising:
computing, for each of the plurality of located components responsive to the locating, a match percentage for each attribute identified in the stored attribute information for the each component and a sum of the match percentage for the each identified attribute; and
removing, from the plurality of located components prior to performing the selection process, any of the plurality of located components for which the sum does not exceed a predetermined match threshold.

6. The method according to claim 1, further comprising:
determining, responsive to the removing, if any of the described elements are not matched by any of the selected components in the updated aggregated list; and
responsive to determining that any of the described elements are not matched, repeating the iteratively processing for the not-matched elements and the removing until the selected components in the updated aggregated list match all of the described elements.

7. The method according to claim 1, wherein the components available for selection are software components.

8. The method according to claim 1, wherein the components available for selection are hardware components.

9. The method according to claim 1, wherein the components available for selection are services.

10. The method according to claim 1, wherein:
the model specification comprises a placeholder for each of the plurality of elements; and
the updated aggregated list identifies at least one component selected for replacing each placeholder.

11. The method according to claim 1, wherein:
the model specification is represented using a structural view of the system, a behavioral view of the system, and an operational view of the system;
the keywords associated with elements in the structural view describe the needed components and for each of the components, each of at least one executable method of the component;
the keywords associated with elements in the behavioral view describe interactions among the needed components; and
the keywords associated with elements in the operational view describe a physical realization of the needed components.

12. A system for configuring a set of components to assemble a system, comprising:
a computer comprising a processor; and
instructions which are executable, using the processor, to implement functions comprising:
obtaining an architectural model specification that describes a plurality of elements to be assembled for realizing requirements of the system and that associates the requirements with corresponding ones of the plurality of elements, wherein each of the requirements is specified using at least one keyword associated with the corresponding ones of the elements in the model specification;
iteratively processing each of the described elements to select a set of components that matches the requirements to be realized for the system, further comprising:
identifying, for the described each element, each of the at least one keyword associated therewith in the model specification;
extracting each of the identified at least one keyword from the model specification;
placing each extracted keyword into an index corresponding to the model specification;
using each indexed keyword to locate, in a component data repository that stores attribute information for each of a plurality of components available for selection for the assembly, each of at least one of the available components for which the stored attribute information contains the indexed keyword, wherein at least one of the indexed keywords locates a plurality of the available components;
responsive to locating the plurality of the available components, performing a selection process to select a particular one of the plurality of located components as matching the requirements associated with the described each element, and otherwise selecting a single one of the located components as matching the requirements associated with the described each element, wherein the selection process comprises providing, to a user, at least a portion of the stored attribute information for each of the located plurality of components and receiving a selection, from the user, of the particular one and wherein the stored attribute information provided to the user comprises a cost factor for each of the located plurality of components;
adding the selected available component to an aggregated list of selected components for the assembly; and
adding, to the aggregated list, any of the available components which are identified, in the stored attribute information for the selected available component, as being co-requisites of the selected available component;
removing, from the aggregated list, any of the selected components which are determined to be incompatible with at least one other one of the selected components, thereby creating an updated aggregated list of selected components; and providing the updated aggregated list of selected components as input to a system builder application that uses the provided list to package the selected components together for assembling the system.

13. The system according to claim 12, further comprising removing, from the plurality of located components prior to performing the selection process, any of the plurality of located components for which a predetermined match threshold is not exceeded in the locating.

14. The system according to claim 12, wherein:

the adding the selected available component to the aggregated list further comprises adding, to an incompatibility list, an identification of any of the available components identified in the stored attribute information for the selected available component as being incompatible with the selected available component; and the removing any of the selected components which are determined to be incompatible further comprises removing any of the selected components which are identified in the incompatibility list.

15. A computer program product for configuring a set of components to assemble a system, the computer program product comprising:

a non-transitory computer readable storage medium having computer readable program code embodied therein, the computer readable program code configured for:

obtaining an architectural model specification that describes a plurality of elements to be assembled for realizing requirements of the system and that associates the requirements with corresponding ones of the plurality of elements, wherein each of the requirements is specified using at least one keyword associated with the corresponding ones of the elements in the model specification;

iteratively processing each of the described elements to select a set of components that matches the requirements to be realized for the system, further comprising:

identifying, for the described each element, each of the at least one keyword associated therewith in the model specification;

extracting each of the identified at least one keyword from the model specification;

placing each extracted keyword into an index corresponding to the model specification;

using each indexed keyword to locate, in a component data repository that stores attribute information for each of a plurality of components available for selection for the assembly, each of at least one of the available components for which the stored attribute information contains the indexed keyword, wherein at least one of the indexed keywords locates a plurality of the available components;

responsive to locating the plurality of the available components, performing a selection process to select a particular one of the plurality of located components as matching the requirements associated with the described each element, and otherwise selecting a single one of the located components as matching the requirements associated with the described each element, wherein the selection process comprises providing, to a user, at least a portion of the stored attribute information for each of the located plurality of components and receiving a selection, from the user, of the particular one and wherein the stored attribute information provided to the user comprises a cost factor for each of the located plurality of components;

adding the selected available component to an aggregated list of selected components for the assembly; and adding, to the aggregated list, any of the available components which are identified, in the stored attribute information for the selected available component, as being co-requisites of the selected available component;

removing, from the aggregated list, any of the selected components which are determined to be incompatible with at least one other one of the selected components, thereby creating an updated aggregated list of selected components; and providing the updated aggregated list of selected components as input to a system builder application that uses the provided list to package the selected components together for assembling the system.

16. The computer program product according to claim 15, wherein the computer readable program code is further configured for:

computing, for each of the plurality of located components responsive to the locating, a match percentage for each attribute identified in the stored attribute information for the each component and a sum of the match percentage for the each identified attribute; and removing, from the plurality of located components prior to performing the selection process, any of the plurality of located components for which the sum does not exceed a predetermined match threshold.

* * * * *